(12) United States Patent
Hawthorne

(10) Patent No.: US 8,956,093 B1
(45) Date of Patent: Feb. 17, 2015

(54) SEAL ARRANGEMENT FOR A HIGH SPEED SPINDLE WITH THROUGH THE SPINDLE COOLING

(75) Inventor: Brian Douglas Hawthorne, Simi Valley, CA (US)

(73) Assignee: Mag IAS, LLC, Sterling Heights, MI (US)

( * ) Notice: Subject to any disclaimer, the term of this patent is extended or adjusted under 35 U.S.C. 154(b) by 586 days.

(21) Appl. No.: 13/294,647

(22) Filed: Nov. 11, 2011

(51) Int. Cl.
*B23Q 11/10* (2006.01)

(52) U.S. Cl.
USPC .......................................... 409/135; 409/233

(58) Field of Classification Search
CPC .......................... B23Q 11/1015; B23Q 11/103
USPC ........ 409/135, 136, 233, 134; 408/56, 57, 59; 137/580, 798
See application file for complete search history.

(56) References Cited

U.S. PATENT DOCUMENTS

| | | | |
|---|---|---|---|
| 4,552,495 A | | 11/1985 | Malzkorn |
| 4,976,282 A | * | 12/1990 | Kubala ........................ 137/580 |
| 5,322,494 A | | 6/1994 | Holtey et al. |
| 5,676,506 A | * | 10/1997 | Sugata ........................ 409/136 |
| 5,707,186 A | * | 1/1998 | Gobell et al. ................. 409/136 |
| 5,782,586 A | * | 7/1998 | Geissler ........................ 408/56 |
| 6,050,756 A | | 4/2000 | Buchholz et al. |
| 6,059,702 A | | 5/2000 | Winkler et al. |
| 6,398,468 B1 | | 6/2002 | Bayer et al. |
| 6,602,031 B2 | * | 8/2003 | Hara ........................... 409/131 |
| 6,860,683 B2 | | 3/2005 | Choi |
| 7,090,448 B2 | | 8/2006 | Stoll et al. |
| 7,367,762 B2 | | 5/2008 | Takase et al. |
| 7,484,916 B1 | | 2/2009 | Tanis |
| 8,047,576 B2 | * | 11/2011 | Ford et al. ...................... 285/95 |
| 2003/0053876 A1 | * | 3/2003 | Antoun ........................ 409/233 |
| 2007/0014647 A1 | | 1/2007 | Watzke et al. |
| 2008/0080943 A1 | | 4/2008 | Bernhard et al. |
| 2009/0053005 A1 | | 2/2009 | Kikkawa |
| 2010/0272530 A1 | | 10/2010 | Rozzi et al. |

* cited by examiner

*Primary Examiner* — Eric A Gates
*Assistant Examiner* — Paul M Janeski
(74) *Attorney, Agent, or Firm* — Reising Ethington P.C.

(57) ABSTRACT

An arrangement for sealing a pressurized coolant system for a drawbar cylinder rod and a spindle drawbar in a machine tool utilizes a stationary mounting plate for supporting a piston plate and a drawbar cylinder rod. A pulley is mounted on the spindle for driving the spindle and a rotary seal that rotates with the spindle is mounted to the spindle. A non-rotating seal is mounted on the mounting plate. A planar sealing surface is formed by the contact between the non-rotating seal and the rotary seal, whereby a reliable fluid seal is formed between the rotating and the non-rotating structures of the pressurized coolant system.

10 Claims, 4 Drawing Sheets

SEAL ARRANGEMENT FOR A HIGH SPEED SPINDLE WITH THROUGH THE SPINDLE COOLING

FIELD

The device relates to a seal arrangement for a high speed spindle with through the spindle cooling having an improved sealing system between the rotating spindle structure and the stationary cylinder mechanism that actuates the drawbar.

BACKGROUND

Machine spindles with an axially positioned drawbar arrangement for securing and releasing a tool holder and a tool from the end of the spindle are well known in the art. The drawbar is often actuated by a piston mechanism that is mechanically coupled to the drawbar. Machine spindles also may also be provided with passageways for coolant to be delivered to the end of the spindle for cooling the spindle bearings and the tool/workpiece interface. Such cooling systems may include an axial passageway through the drawbar. Since the source of the coolant is most likely stationary, and the drawbar and the surrounding spindle are rotating, seals must be provided between the stationary and rotating structures in order to prevent the coolant from leaking out of its intended delivery path. If coolant seals fail, coolant can leak and spray around inside the machining center where it is not expected, causing part failures and machine downtime, and requiring service to restore the machine to operation.

SUMMARY

A coolant management system used with a vertical machining center spindle provides a method and apparatus for reliably sealing pressurized coolant flow through the center of the spindle drawbar shaft and through the cutting tool ports to cool the spindle and the tool. Bleed air from the drawbar cylinder is used to pressurize a floating seal that is stationary and a rotating seal that is coupled to the spindle.

DETAILED DESCRIPTION

Figure 1:
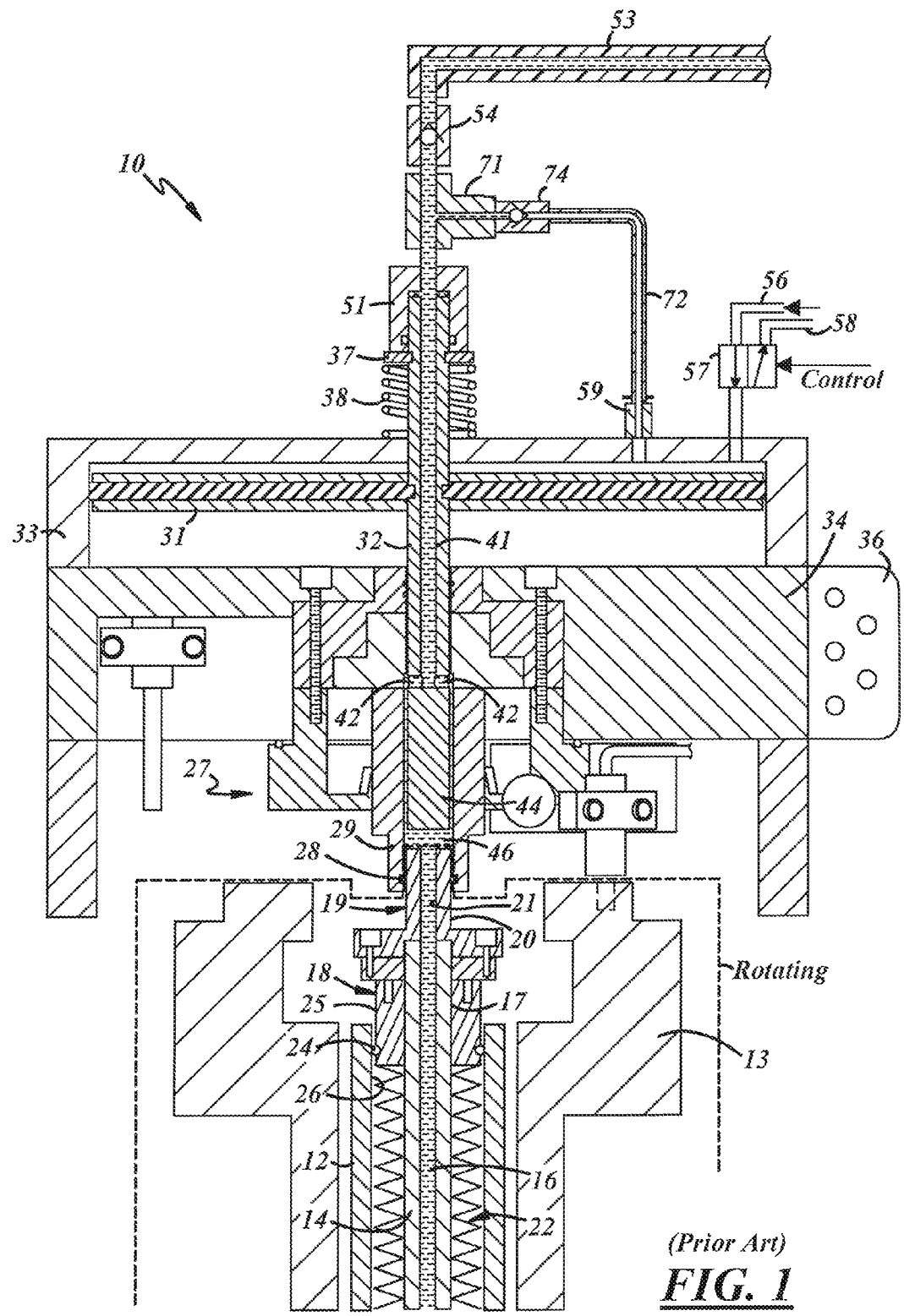
FIG. 1 shows a prior art drawbar mechanism with a through the spindle coolant system.

FIG. 1 shows a prior art drawbar mechanism and through the spindle coolant system generally designated by the reference numeral 10. A spindle 12 is positioned within a spindle pulley 13 that is driven by a belt (not shown) or other suitable driving device as well known in the art. The spindle 12 contains a drawbar 14 that is used to secure and release a tool holder and a tool (not shown) (collectively referred to hereinafter as a "tool") in the bottom rotating end of the spindle. The drawbar 14 has an axial passage 16 to provide a coolant path from the top 17 of the drawbar to a tool held in the bottom of the spindle. The top 17 of the drawbar is mounted in a spring pilot 18, and a knockout cap 19 is mounted on top of the spring pilot. The knockout cap 19 has an outer cylindrical surface 20 and an axial through passage 21 for coolant that communicates with the axial passage 16 in the drawbar. The bottom of the spring pilot 18 is biased by a stack of Bellville washers 22, and an O-ring 24 provides a seal between the outside surface 25 of the spring pilot 18 and the inside surface 26 of the spindle. The top portion of the knockout cap 19 fits into the lower portion of a rotating seal assembly 27. The rotating seal assembly 27 includes an O-ring 28 in a seal cuff 29 that seals against the outer cylindrical surface 20 of the knockout cap. The sealing surface between the O-ring 28 and the cylindrical surface 20 of the knockout cap 19 defines a cylinder.

A movable piston mechanism comprises a piston plate 31 and a drawbar cylinder rod 32 that operate in a drawbar cylinder 33. The drawbar cylinder 33 is mounted on a support plate 34, and the support plate 34 may be attached to the body of the machine tool or other stationary structure by a mounting bracket 36. A spring pad 37 is rigidly mounted on the upper portion of the drawbar cylinder rod 32 and a compression spring 38 is positioned between the spring pad and the top of the drawbar cylinder 33. The compression spring 38 maintains the piston plate 31 in a raised position in the drawbar cylinder 33 as shown in FIG. 1. The seal assembly 27 is mounted to the support plate 34 and surrounds the lower end 44 of the drawbar cylinder rod 32. The drawbar cylinder rod 32 has an axial coolant bore 41 extending from the top of the rod to one or more outlet ports 42 formed along the length of the drawbar cylinder rod. The outlet ports 42 allow coolant to flow from the axial bore 41 around the lower end 44 of the drawbar cylinder rod 32, and into an axial gap 46 between the lower end 44 of the drawbar cylinder rod and the top of the knockout cap 19. Fluid in the axial gap 46 flows into the axial bore 21 of the knockout cap 19 and into the axial passage 16 in the drawbar.

The top of the drawbar cylinder rod 32 fits into an adapter 51 that allows the drawbar cylinder rod to slide up and down in response to the motion of the piston plate 31 without leaking coolant. The adapter 51 is coupled to a coolant hose 53 through a one-way check valve 54. A supply line 56 and a control valve 57 is coupled to the top of the drawbar cylinder 33 and provides an inlet for air or other fluid to the interior of the drawbar cylinder 33 to depress the piston plate 31. The control valve 57 may be shifted to connect the interior of the drawbar cylinder 33 to an exhaust port 58 to vent the cylinder to atmosphere. A feedback line 55 also connects the interior of the drawbar cylinder 33 to the coolant hose 53.

In use, the drawbar 14, the spring pilot 18, and the knockout cap 19 are all movable in the axial direction relative to the spindle 12 and the pulley 13, and pressing on the top of the knockout cap depresses the drawbar 14 to release a tool that is held in a chuck (not shown) in the end of the spindle. Releasing the downward force on the knockout cap allows the Bellville washers 22 to raise the drawbar, and to secure a tool in the chuck in the end of the spindle. With the control valve 57 in the position shown in FIG. 1, air from the supply line 56 is used to pressurize the top of the drawbar cylinder 33 to drive the piston plate 31 and the drawbar cylinder rod 32 downward. The drawbar cylinder rod 32 presses on the knockout cap 19 and depresses the drawbar 14. The downward stroke of the piston plate 31 is used to engage and release a tool in the end of the spindle 12 by pressing on and releasing the drawbar 14 in a manner that is well known in the art. A small amount of air in the drawbar cylinder 33 is bled off by the feedback line 72 and is used to pressurize the coolant in the flowpath below the one way valve 54. Pressurizing the coolant assists in clearing chips and other debris from the end of the tool. Shifting the control valve 57 exhausts the air from the interior of the cylinder 33 through the exhaust port 58 and allows the compression spring 38 to withdraw the lower end 44 of the drawbar cylinder rod 32 from contact with the top of the knockout cap 19. The retraction of the end of the drawbar cylinder rod 32 from the top of the knockout cap 19 allows the Bellville washers 22 to restore the drawbar 14 to the retracted position shown in FIG. 1.

In FIG. 1, the dotted line separates the rotating structure from the non-rotating structure. Coolant in the axial gap 46 flows into the axial passage 21 of the knockout cap 19, and into the passage 16 in the drawbar 14 to outlet ports formed in the cutting tool, all of which are well known in the art. The O-ring 28 in the seal cuff 29 is intended to prevent the coolant from the axial gap 46 flooding the area around the lower end of the knockout cap 19 and leaking into the spindle 12. The drawbar 14 and the knock-out cap 19 rotate with the spindle 12 at speeds as high as 15,000 rpm. Since the knockout cap 19 is rotating with the spindle, and the drawbar cylinder rod 32 and the seal assembly 27 are non-rotating, primary sealing between the rotating and the non-rotating structures to contain the coolant which flows around the lower end 44 of the drawbar cylinder rod 32 is provided by the O-ring 28 that is located between the outer cylindrical surface 20 of the knockout cap 19 and the inner cylindrical surface of the seal cuff 29. The O-ring 28 is required to maintain its integrity while the spindle 12 and the knockout cap 19 rotate at 15,000 rpm and the seal cuff 29 remains stationary. The Belleville washers 22 pressing against the bottom of the spring pilot 18 do not act uniformly on the bottom of the spring pilot however, and as a result, the knockout cap 19 is often skewed slightly and does not run true to the axis of rotation of the spindle 12 and the drawbar 14. This causes the knockout cap 19 to wobble as the spindle rotates, and although the wobble may be slight, the high rotational speed of the spindle 12 makes it difficult for the O-ring 28 to be effective against the cylindrical surface 20 of the knockout cap 19, and the O-ring 28 is rapidly worn by the wobbling action.

Figures 2, 2A:
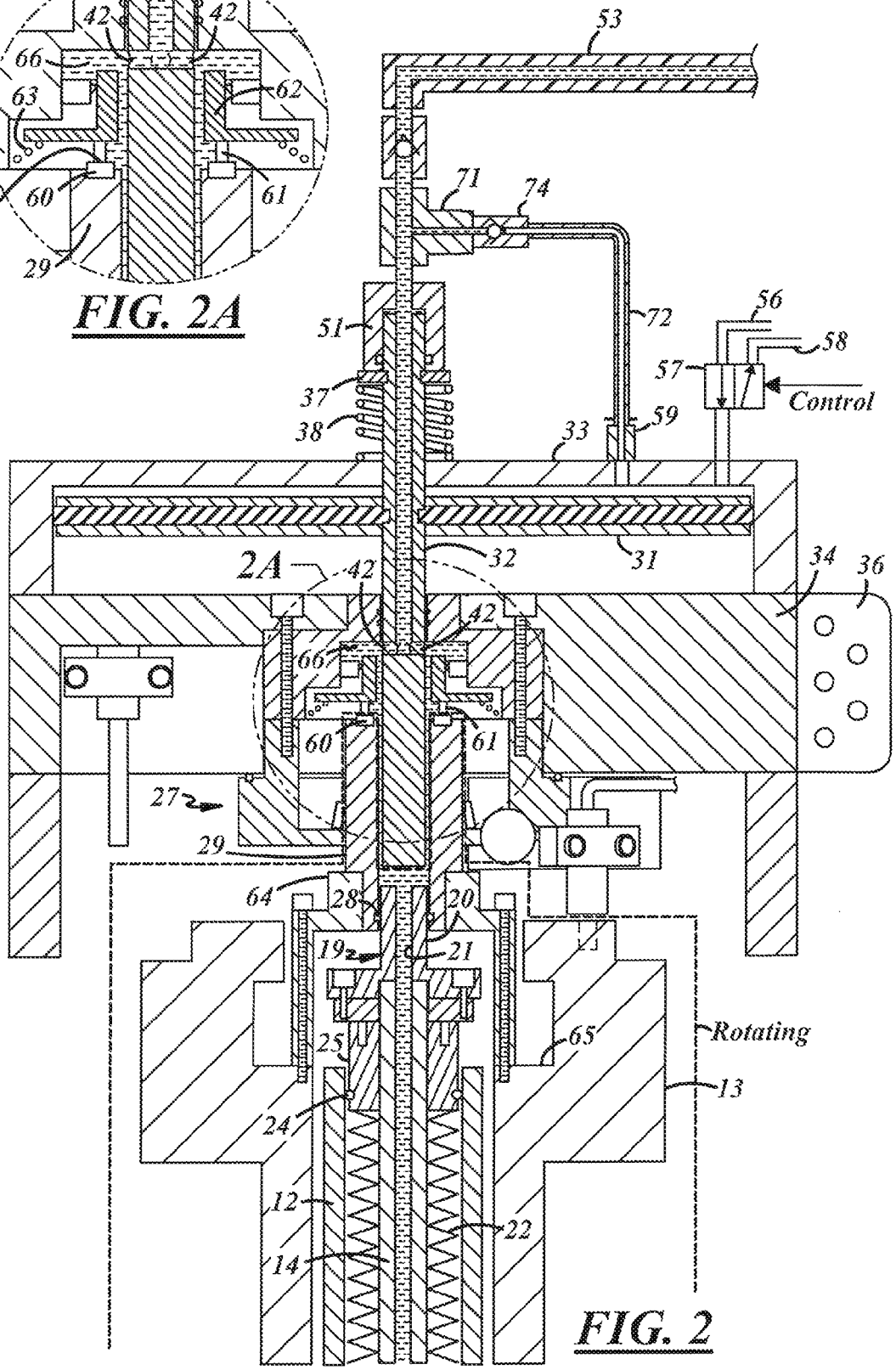
FIG. 2 shows an improved through the spindle coolant system.
FIG. 2A is a detail view of section 2A of FIG. 2.

Turning now to FIG. 2, in order to provide a more efficient and longer lasting seal, the seal cuff 29 and the O-ring 28 are both mounted to the pulley 13, and both rotate with the spindle 12, so there is no relative rotary motion between the seal cuff 29 and the knockout cap 19 when the spindle is rotating. In FIG. 2, the dotted line separates the rotating structure from the non-rotating structure. As best seen in FIG. 2A, primary sealing between the rotating and non-rotating parts of the assembly takes place between a rotating seal 60 that is mounted in the top of the seal cuff 29 that has a planar sealing surface 68 and a floating seal 61 that is mounted on a floating seal flange 62. The floating seal flange 62 is mounted on a return spring 63. Coolant from the outlet ports 42 in the drawbar cylinder rod 32 fill a rotary union chamber 66 that is formed above the seal flange 62. The pressure of the coolant in the rotary union chamber 66 together with pressure from the feedback line 72 that is coupled to pressure in the drawbar cylinder 33, presses the floating seal 61 into contact with the planar sealing surface 68 of the seal 60 in the top of the seal cuff 29, providing a reliable and fluid tight seal.

The seal cuff 29 is rigidly mounted on a lower seal base 64 that is mounted by bolts or other suitable fasteners in a pocket 65 in the interior of the spindle pulley 13. The lower seal base 64 and the seal cuff 29 rotate true to the spindle axis, and as a result, the seal cuff 29 does not wobble as it rotates, and a consistent and reliable seal can be made between the planar sealing surface 68 of the rotating seal 60 and the floating seal 61. Additionally, because the sealing surface 68 between the seals 60 and 61 defines a plane, and not a cylinder, the seals 60 and 61 are more tolerant to any wobble in the rotation of the seal 60 relative to the axis of rotation of the spindle 12.

Figure 3:
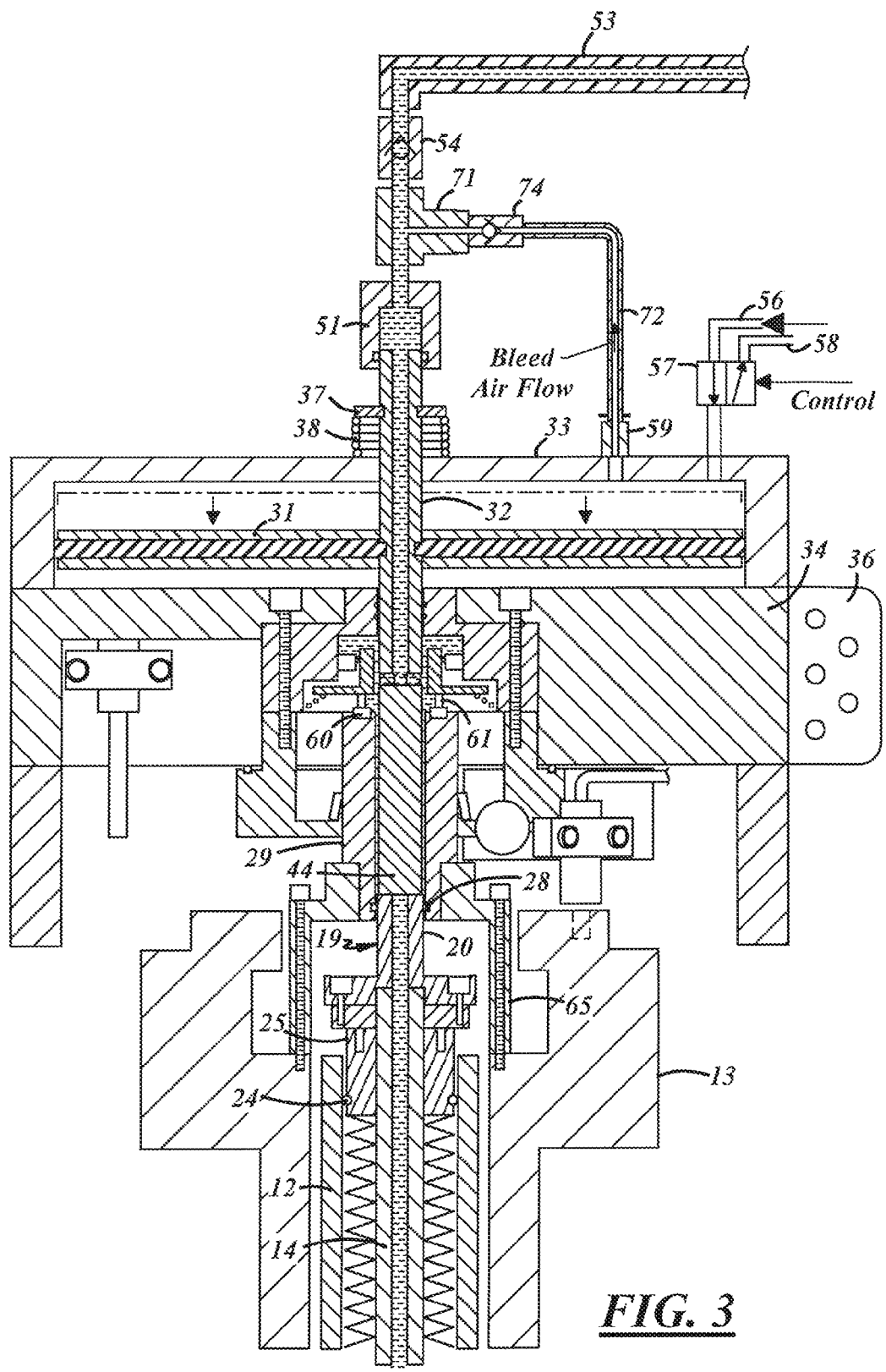
FIG. 3 shows the through the spindle coolant system of FIG. 2 with the piston plate in the advanced position depressing the drawbar.

FIG. 3 shows air from the supply line 56 flowing through the valve 57 and into the cylinder 33, forcing the piston plate 31 and the drawbar cylinder rod 32 to a lowered position. The lower end 44 of the drawbar cylinder rod 32 presses on the knockout cap 19 and depresses the drawbar 14 relative to the spindle 12 in order to release a tool.

Figure 4:
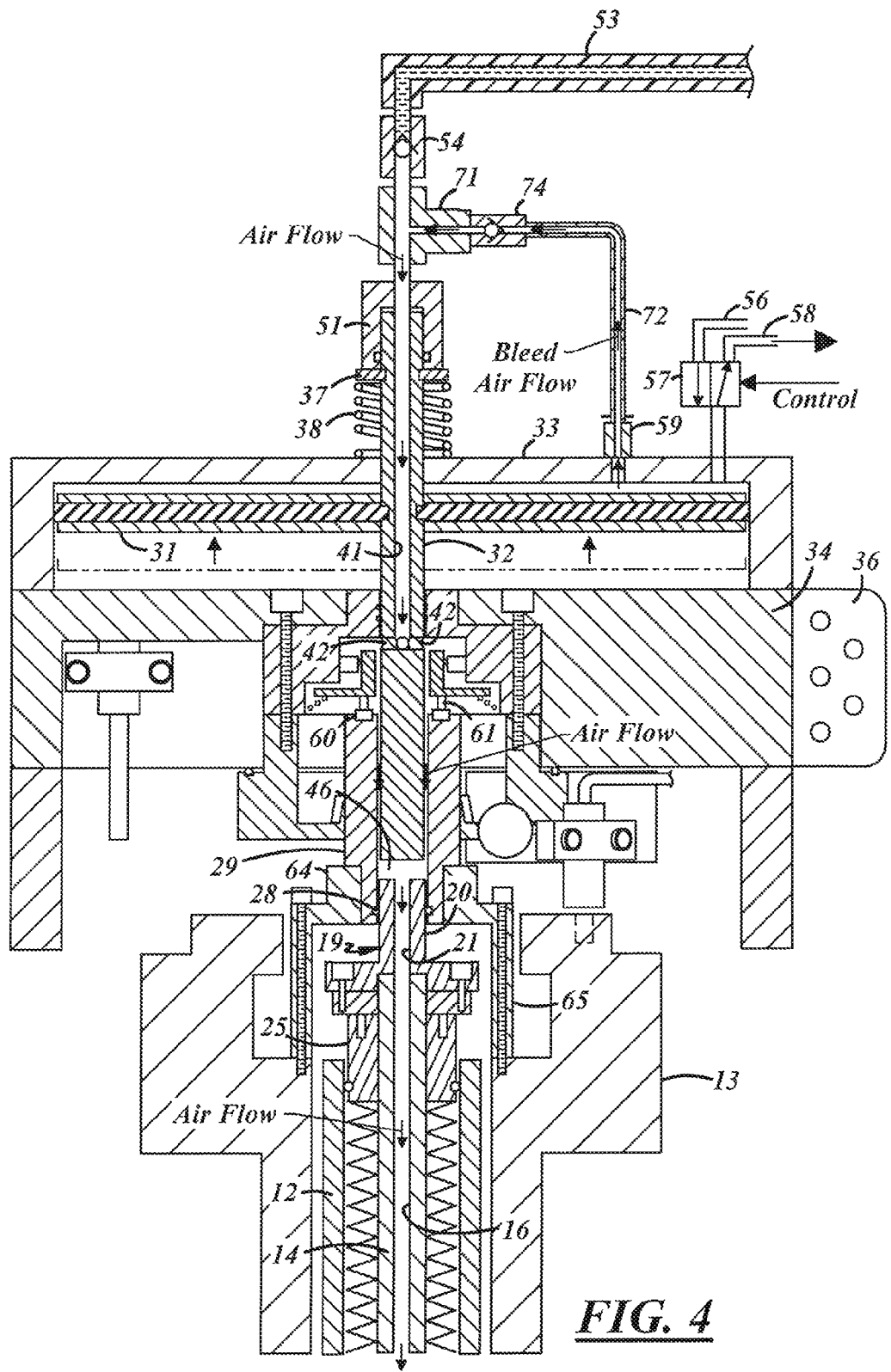
FIG. 4 shows the through the spindle coolant system of FIG. 2 with the piston plate in the retracted position.

A small amount of air from the cylinder 33 passes through a bleed orifice 59 and into the feedback line 72 that is coupled to a T-fitting on the coolant hose 53. A one-way valve 54 is coupled between the coolant hose 53 and the T-fitting 71. When air is fed into the cylinder 33, or when the piston plate 31 returns to the raised position as shown in FIG. 4, air bleeds through the orifice 59 into the feedback line 72, into the T-fitting 71, and down through the coolant passageways through the drawbar cylinder rod 32 and the drawbar 14 to coolant outlets formed in the tool to blow away coolant and chips that have accumulated on the face of the cutting tool.

The feedback line 72 includes one-way valve 74 that is coupled to the T-fitting 71 to prevent coolant from the coolant hose 53 flowing through the feedback line 72 and into the drawbar cylinder 33 when coolant is being supplied to the tool. The check valve 54 in the coolant hose 53 above the T-fitting 71 opens at 50 psi to allow coolant flow from the coolant hose 53 to the drawbar cylinder rod 32 when the supply pressure is above 50 psi, and closes when the coolant supply pump coupled to the coolant hose 53 is turned off to prevent residual coolant from the coolant hose 53 leaking through the system after a tool has been disconnected from the end of the spindle. This prevents residual fluid contained in the coolant hose 53 from dribbling into the seal area and down the drawbar unexpectedly.

Having thus described the invention, various modifications and alterations will be apparent to those skilled in the art, which modifications and alterations will be within the scope of the invention as defined by the appended claims.

I claim:

1. An arrangement for sealing a pressurized coolant system for a drawbar cylinder rod and a spindle drawbar in a machine tool, the arrangement comprising:
    a spindle;
    a drawbar mounted in the spindle having an axial passage for pressurized coolant; a pulley mounted on the spindle for driving the spindle;
    a drawbar cylinder comprising a piston plate and a drawbar cylinder rod; and,
    a seal assembly surrounding a portion of the drawbar cylinder rod; the seal assembly comprising:
    a non-rotating seal;
    a rotary seal that rotates with the spindle;
    a planar sealing surface formed by the contact between the non-rotating seal and the rotary seal, whereby a reliable fluid seal is formed between the rotating and the non-rotating structures of the pressurized coolant system; and,
    a stable mounting structure attached to the pulley for mounting the rotary seal, whereby the stable mounting structure rotates on-axis with the pulley and the spindle.

2. The arrangement of claim 1 further comprising:
    a seal cuff that rotates with the spindle and supports the rotary seal; and,
    a lower seal base supporting the seal cuff, the lower seal base comprising the stable mounting structure that is attached to the pulley.

3. The arrangement of claim 2 further comprising:
a knockout cap mounted on the drawbar, whereby the end of the drawbar cylinder rod pushes on the knockout cap to depress the drawbar;
the seal cuff surrounding a portion of the knockout cap; and,
a seal mounted in the seal cuff for sealing against the knockout cap, whereby the knockout cap rotates with the spindle so that there is no relative rotary motion between the seal cuff and the knockout cap.

4. The arrangement of claim 2 further comprising:
a seal between the seal cuff and the upper portion of the knockout cap, the rotation of the seal cuff with the spindle ensuring that there is no relative rotary motion between the seal cuff and the knockout cap.

5. The arrangement of claim 1 further comprising:
a source of pressurized coolant;
an axial passage in the drawbar cylinder rod for the pressurized coolant; and
a chamber having a floating seal flange in the seal assembly for receiving pressurized coolant, the non-rotating seal being mounted on the floating seal flange, whereby the pressurized coolant acts on the floating seal flange to press the non-rotating seal against the rotary seal.

6. An arrangement for sealing a pressurized coolant system for a drawbar cylinder rod and a spindle drawbar in a machine tool, the arrangement comprising: a spindle;
a drawbar mounted in the spindle having an axial passage for pressurized coolant;
a pulley mounted on the spindle for driving the spindle;
a drawbar cylinder comprising a piston plate and a drawbar cylinder rod;
a seal assembly surrounding a portion of the drawbar cylinder rod, the seal assembly comprising:
a non-rotating seal;
a rotary seal that rotates with the spindle;
a planar sealing surface formed by the contact between the non-rotating seal and the rotary seal, whereby a reliable fluid seal is formed between the rotating and the non-rotating structures of the pressurized coolant system; and,
a feedback line for coupling the drawbar cylinder to the axial passage in the drawbar cylinder rod, whereby pressure in the drawbar cylinder assists in pressing the non-rotating seal against the rotary seal.

7. An arrangement for sealing a pressurized coolant system for a drawbar cylinder rod and a spindle drawbar in a machine tool, the arrangement comprising:
a spindle;
a drawbar mounted in the spindle having an axial passage for pressurized coolant;
a pulley mounted on the spindle for driving the spindle;
a drawbar cylinder comprising a piston plate and a drawbar cylinder rod;
a seal assembly surrounding a portion of the drawbar cylinder rod, the seal assembly comprising:
a non-rotating seal;
a rotary seal that rotates with the spindle;
a planar sealing surface formed by the contact between the non-rotating seal and the rotary seal, whereby a reliable fluid seal is formed between the rotating and the non-rotating structures of the pressurized coolant system;
a coolant supply line for admitting coolant to the axial bore in the cylinder drawbar rod;
a drawbar cylinder containing the piston plate and mounted on the stable mounting structure;
a drawbar cylinder inlet for admitting a pressurized fluid to the interior of the drawbar cylinder to depress the piston plate;
a control valve for releasing pressurized fluid from the interior of the drawbar cylinder to allow retraction of the piston plate; and,
a feedback line between the drawbar cylinder and the coolant supply line, whereby pressurized fluid from the drawbar cylinder flows into the axial passage in the drawbar cylinder rod and the axial passage in the drawbar for clearing coolant and debris from the end of the drawbar.

8. The arrangement of claim 7 further comprising:
an axial passage in the drawbar cylinder rod for pressurized coolant; and,
a chamber having a floating seal flange in the seal assembly for receiving pressurized coolant, the non-rotating seal being mounted on the floating seal flange, whereby the pressurized fluid from the feedback line acts on the floating seal flange to press the non-rotating seal against the rotary seal.

9. The arrangement of claim 7 further comprising:
a one way valve in the feedback line between the drawbar cylinder and the coolant supply line, the one-way valve preventing fluid from the coolant supply line from entering the drawbar cylinder through the feedback line.

10. The arrangement of claim 7 further comprising:
a check valve in the coolant supply line, the check valve opening in response to a preselected pressure in the coolant supply line and closing in response to a reduction in pressure in the coolant supply line, whereby the flow of coolant to the spindle is positively cut off by the check valve in response to a reduction of pressure in the coolant supply line.

* * * * *